United States Patent

Nagasaki et al.

[11] Patent Number: 4,812,494
[45] Date of Patent: Mar. 14, 1989

[54] STABILIZED STYRENE POLYMER

[75] Inventors: Hideo Nagasaki, Osaka; Shinichi Yachigo, Toyonaka; Tamaki Ishii, Suita; Masakatsu Yoshimura, Sakai; Yukoh Takahashi, Toyonaka; Hiroki Yamamoto, Nishinomiya, all of Japan

[73] Assignee: Sumitomo Chemical Company, Limited, Osaka, Japan

[21] Appl. No.: 128,874

[22] Filed: Dec. 4, 1987

[30] Foreign Application Priority Data

Dec. 19, 1986 [JP] Japan ................... 61-304826

[51] Int. Cl.⁴ .............................. C08H 5/34
[52] U.S. Cl. ........................ 524/91; 524/103
[58] Field of Search ...................... 524/91, 103

[56] References Cited

U.S. PATENT DOCUMENTS

| | | | |
|---|---|---|---|
| 4,206,111 | 6/1980 | Valdiserri et al. | 324/91 |
| 4,226,763 | 10/1980 | Dexter et al. | 524/91 |
| 4,348,524 | 9/1982 | Karrer et al. | 546/187 |
| 4,500,662 | 2/1985 | Lai | 524/103 |

FOREIGN PATENT DOCUMENTS

| | | |
|---|---|---|
| 0062322 | 10/1982 | European Pat. Off. |
| 2107719 | 5/1983 | United Kingdom |
| 2136805 | 9/1984 | United Kingdom |

Primary Examiner—Kriellion Morgan
Attorney, Agent, or Firm—Stevens, Davis, Miller & Mosher

[57] ABSTRACT

A styrene polymer is stabilized by incorporating into said styrene polymer (A) a hindered piperidine compound represented by the formula

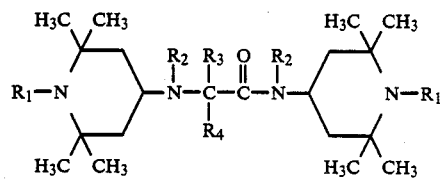

wherein
$R_1$ is a hydrogen atom or an alkyl group having 1 to 3 carbon atoms,
$R_2$ is a hydrogen atom or an alkyl group having 1 to 12 carbon atoms, and
$R_3$ and $R_4$ are each independently an alkyl group having 1 to 4 carbon atoms; and (B) a benzotriazole compound selected from the group consisting of 2-(2-hydroxy-5-methylphenyl)benzotriazole and 2-(2-hydroxy-3-tert-butyl-5-methylphenyl)-5-chlorobenzotriazole.

14 Claims, No Drawings

STABILIZED STYRENE POLYMER

BACKGROUND OF THE INVENTION

(1) Field of the Invention

The present invention relates to a stabilized styrene polymer which is improved especially in weathering resistance.

(2) Description of the Related Art

Owing to the excellent moldability and mechanical and electrical properties, styrene polymers have been used for a variety of commercial products such as household electrical appliances, OA apparatus, automobile parts, etc. Styrene polymers, however, generally have the defect that they tend to be deteriorated by light, in other words, they are poor in weathering resistance.

In order to prevent such deterioration by light, it has been generally practiced to blend various types of weathering stabilizer such as benzophenone, benzotriazole, benzoate, nickel chelate and hindered amine compounds in the styrene polymer.

However, the styrene polymers containing such weathering stabilizer can still hardly be said as quite satisfactory in weathering resistance. Also, the fact is to be noted that, as often practiced recently, various types of pigment are blended in styrene polymer for the purpose of improving external appearance of the molded products, but such blending of pigment tends to adversely affect the weathering resistance of the products.

Among said various types of weathering stabilizers, the hindered piperidine compounds represented by the formula:

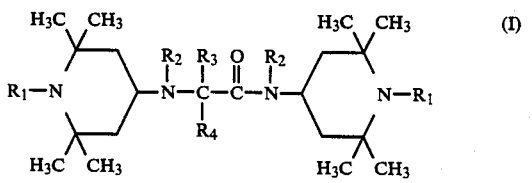

wherein
- $R_1$ is a hydrogen atom or an alkyl group having 1 to 3 carbon atoms,
- $R_2$ is a hydrogen atom or an alkyl group having 1 to 12 carbon atoms, and
- $R_3$ and $R_4$ are each independently an alkyl group having 1 to 4 carbon atoms are known as an effective light stabilizer.

For instance, U.S. Pat. No. 4,500,622 discloses the compound of the formula (I) wherein $R_1$ and $R_2$ are each hydrogen atom and $R_3$ and $R_4$ are each methyl, and it is stated that the use of this compound in combination with a phenolic antioxidant is conductive to the improvement of weathering resistance of certain types of polymers such as polypropylene. However, no satisfactory improving effect is provided for the weathering resistance of styrene polymers even by the combined use of such hindered piperidine compound and phenolic compound.

The present inventors had previously found that the joint use of a hindered piperidine compound of the formula (I), a phenolic antioxidant and a sulfur-containing antioxidant could produce a prominent effect for the stabilization of resins such as polypropylene, polyurethane resin and ABS resin, and applied for a patent under U.S. patent application Ser. No. 754,582. Combined use of said hindered piperidine compound, phenolic antioxidant and sulfur-containing antioxidant could provide a better effect for the stabilization of said resins than the composition disclosed in said U.S. Pat. No. 4,500,622 but was still unable to realize a satisfactory improvement of weathering resistance of styrene polymers blended with a pigment.

SUMMARY OF THE INVENTION

In view of the above, the present inventors have continued with their studies for developing a styrene polymer having excellent weathering resistance even when blended with a pigment, let alone when not blended with a pigment, and as a result, found that a styrene polymer containing weathering stabilizers in a specific combination has very excellent weathering resistance, and the present invention was attained on the basis of such finding.

Thus, the present invention provides a stabilized styrene polymer containing a hindered piperidine compound represented by the above-shown formula (I) and at least one benzotriazole compound selected from 2-(2-hydroxy-5-methylphenyl)benzotriazole and 2-(2-hydroxy-3-tert-butyl-5-methylphenyl)-5-chlorobenzotriazole.

DESCRIPTION OF THE PREFERRED EMBODIMENTS

Typical examples of the hindered piperidine compounds of the formula (I) usable in the present invention are listed in Table 1. The substituent $R_1$ in the formula (I) is preferably a hydrogen atom or a methyl group for the maximized weathering performance, a hydrogen atom being most preferred. The substituent $R_2$ is preferably a hydrogen atom or an alkyl group having 1 to 4 carbon atoms, a hydrogen atom being most preferred. As for the substituents $R_3$ and $R_4$, preferably one of them is a methyl group, more preferably both of them are methyl groups.

TABLE 1

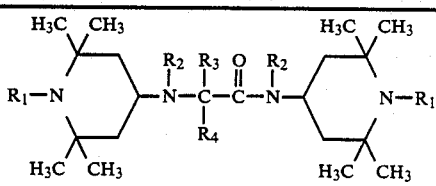

| Hindered piperidine compound No. | $R_1$ | $R_2$ | $R_3$ | $R_4$ |
|---|---|---|---|---|
| H-1 | H | H | $CH_3$ | $CH_3$ |
| H-2 | H | H | $CH_3$ | $CH_2CH_3$ |
| H-3 | H | H | $CH_3$ | $CH_2CH(CH_3)_2$ |
| H-4 | $CH_3$ | H | $CH_3$ | $CH_3$ |
| H-5 | H | $(CH_2)_3CH_3$ | $CH_3$ | $CH_3$ |
| H-6 | $CH_3$ | $(CH_2)_3CH_3$ | $CH_3$ | $CH_3$ |

In the present invention, these hindered piperidine compounds may be used as a mixture comprising two or more of them.

As the benzotriazole compound used in combination with said hindered piperidine compound, one or both of the compounds selected from 2-(2-hydroxy-5-methylphenyl)benzotriazole and 2-(2-hydroxy-3-tert-butyl-5-methylphenyl)-5-chlorobenzotriazole are used.

The styrene polymer of the present invention contains said hindered piperidine compound and benzotriazole compound, the total content of said compounds being usually 0.01 to 5 parts by weight, preferably 0.1 to 2 parts by weight, per 100 parts by weight of said styrene polymer. The weight ratio of said hindered piperidine compound to said benzotriazole compound is usually 20:80 to 95:5, preferably 40:60 to 90:10.

By the term "styrene polymers" used in the present invention are meant not only the polymers obtained by polymerizing styrene monomers but also the copolymers of styrene monomers (main constituent) with other copolymerizable vinyl monomers as well as the copolymers obtained by polymerizing styrene monomers or styrene monomers and other copolymerizable monomers in the presence of a rubber-like polymer.

The term "styrene monomers" used herein refers to styrene, α-methylstyrene and nucleus-substituted styrenes such as tert-butylstyrene and p-methylstyrene.

The vinyl monomers copolymerizable with said styrene monomers, which are usable for forming said copolymers with said styrene monomers, include acrylonitrile, methacrylic acid esters, acrylic acid esters, maleic anhydride, maleimide, N-methylmaleimide, N-ethylmaleimide, N-butylmaleimide, N-laurylmaleimide, N-phenylmaleimide, N-(o-chlorophenyl)maleimide and the like. As the rubber-like polymer which is allowed to exist in said polymerization, there can be used polymers or copolymers of conjugated 1,3-dienes such as butadiene, isoprene and chloroprene, butadiene-styrene copolymer, acrylonitrile-butadiene copolymer, isoprene-isobutylene copolymer, copolymers or terpolymers containing ethylene and propylene, and the like.

The basal styrene polymer used in the present invention may be a mixture of a styrene polymer such as mentioned above and other polymer(s) such as polycarbonate, polyamide, polybutylene terephthalate, polyphenylene oxide, polyvinyl chloride and the like.

The styrene polymer according to the present invention may contain various types of pigment in addition to said weathering stabilizers. Examples of such pigment are titanium oxide, carbon black, yellow iron oxide, titanium yellow, Hansa yellow, benzine yellow, red iron oxide, Permanent red, thioindigo red, ultramarine, phthalocyanine blue, phthalocyanine green, isoindolenone yellow, quinophthalone yellow, condensed azo yellow, perinone orange, quinacridone red, quinacridone scarlet, perylene red, perylene scarlet, condensed azo red, dioxazine violet, indanthrone blue, Cinquasia red, and the like. As pigment dispersant, metal soaps such as calcium stearate, magnesium stearate, etc., can be used.

The styrene polymer according to the present invention may also contain an antioxidant such as phenolic compound, amine compound or phosphite compound. Examples of phenolic antioxidants usable in the present invention include 2,6-di-tert-butyl-4-methylphenol, n-octadecyl-3-(3,5-di-tert-butyl-4-hydroxyphenyl)propionate, 4,4'-butylidene-bis-(3-methyl-6-tert-butylphenol), 2,2'-methylene-bis-(4-methyl-6-tert-butylphenol), 2-tert-butyl-6-(3-tert-butyl-5-methyl-2-hydroxybenzyl)-4-methylphenyl acrylate, 4,4'-thio-bis-(3-methyl-6-tert-butylphenol), 2,2'-methylene-bis-4-methyl-6-nonylphenol), tetrakis[methylene-3-(3,5-di-tert-butyl-4-hydroxyphenyl)propionate]-methane, 1,3,5-tris(4-tert-butyl-3-hydroxy-2,6-dimethylbenzyl)isocyanurate, and 3,9-bis[2-3-(3-tert-butyl-4-hydroxy-5-methylphenyl)propionyloxy-1,1-dimethylethyl]-2,4,8,10-tetraoxaspiro[5,5]undecane. Examples of amine type antioxidants usable in the present invention include diphenylamine, dibutyldiphenylamine, dioctyldiphenylamine, and dinonyldiphenylamine. Examples of phosphite type antioxidants usable in the present invention include tris(nonylphenyl)phosphite, tris(mono-/dinonylphenyl)phosphite, tris(2-tert-butyl-4-methylphenyl)phosphite, tris(2,4-di-tert-butylphenyl)phosphite, tris(3,5-di-tert-butyl-4-hydroxyphenyl)phosphite, bis(2,4-di-tert-butylphenyl)pentaerythritol diphosphite, bis(2,6-di-tert-butyl-4-methylphenyl)pentaerythritol diphosphite, distearylpentaerythritol diphosphite, and tetrakis(2,4-di-tert-butylphenyl)-4,4'-biphenylene diphosphite.

Other additives such as processing oil, plasticizer, lubricant, antistatic agent, flame retardant, releasing agent, mildewproofing agent, etc., can be further contained in the styrene polymer of the present invention, provided that such additives don't affect the properties of the polymer.

As described above, the stabilized styrene polymer of the present invention can be obtained by incorporating the specified weathering stabilizers and, if necessary, the above-mentioned various types of additives in a basal styrene polymer. Said component materials may be blended at any stage in the course of preparation of the styrene polymer, or they may be blended in the basal styrene polymer by using a mixing machine such as Bumbury mixer, roll mill, kneader, etc. Any suitable method may be used for such blending.

The styrene polymer according to the present invention has very excellent weathering resistance that could never be obtainable with any conventional products, even when a pigment and/or other additives are blended in the polymer.

The invention will be further described below by showing the examples thereof.

EXAMPLE 1

To Kralastic MH (an ABS resin commercially available from Sumitomo Naugatuck Co., Ltd.) was added thrice as much an amount of an isopropyl alcohol/chloroform (4/1 by weight) mixed solvent, and the mixture was stirred at 50° C. for 24 hours to extract a stabilizer. After repeating this operation four times, the resulting product was dried in vacuo to obtain a non-stabilized ABS resin.

To 100 parts by weight of this non-stabilized ABS resin were dry-blended 2 parts by weight of titanium oxide, 0.3 part by weight of 4,4'-butylidene-bis-(3-methyl-6-tert-butylphenol), 0.3 part by weight of tris(nonylphenyl)phosphite and specified amounts (parts by weight) of weathering stabilizers shown in Table 2, and the mixture was extruded by using a 30 mmφ extruder at 230° C. to form the pellets.

Said pellets were then shaped into a sheet of 60 mm×60 mm with 3 mm thickness by using an 5.5 oz. injection molding machine at 240° C. to prepare the specimens for the weathering test.

The weathering test was conducted by exposing the specimen to the sunshine in a sunshine weather-ometer (black panel having a temperature of 83° C. and water spray time of 18 minutes per 120 minutes), and the weathering resistance was evaluated by measuring the change of gloss with a lapse of time and by expressing as gloss life the time required till the gloss value dropped to 50.

The results are shown in Table 2.

The symbols used for indicating the respective weathering stabilizers in Table 2 represent the compounds in Table 1 and the following compounds:

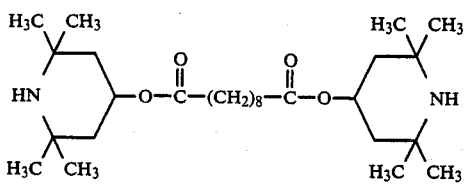

H-7

UVA-1: 2-(2-hydroxy-5-methylphenyl)benzotriazole
UVA-2: 2-(2-hydroxy-3-tert-butyl-5-methylphenyl)-5-chlorobenzotriazole
UVA-3: 2-(2-hydroxy-3,5-di-tert-butylphenyl)benzotriazole
UVA-4: 2-hydroxy-4-octoxybenzophenone

TABLE 2

| | | Hindered piperidine compound | | Benzotriazole compound | | Others | | Weathering resistance Gloss life (hr) |
|---|---|---|---|---|---|---|---|---|
| | No. | Name | Amount blended | Name | Amount blended | Name | Amount blended | |
| Example | 1 | H-1 | 0.5 | UVA-1 | 0.5 | | | 650 |
| | 2 | H-1 | 0.5 | UVA-2 | 0.5 | | | 670 |
| | 3 | H-3 | 0.5 | UVA-1 | 0.5 | | | 630 |
| | 4 | H-4 | 0.5 | UVA-2 | 0.5 | | | 640 |
| | 5 | H-6 | 0.5 | UVA-1 | 0.5 | | | 620 |
| | 6 | H-1 | 0.8 | UVA-2 | 0.2 | | | 670 |
| | 7 | H-1 | 0.2 | UVA-2 | 0.8 | | | 640 |
| | 8 | H-1 | 0.4 | UVA-2 | 0.1 | | | 610 |
| Comparative Example | 1 | H-1 | 1 | | | | | 460 |
| | 2 | H-3 | 1 | | | | | 440 |
| | 3 | H-4 | 1 | | | | | 450 |
| | 4 | H-6 | 1 | | | | | 420 |
| | 5 | | | UVA-1 | 1 | | | 300 |
| | 6 | | | UVA-2 | 1 | | | 300 |
| | 7 | H-1 | 0.5 | | | UVA-3 | 0.5 | 460 |
| | 8 | H-1 | 0.5 | | | UVA-4 | 0.5 | 470 |
| | 9 | H-7 | 0.5 | UVA-1 | 0.5 | | | 500 |

EXAMPLE 2

The process of Example 1 was followed by using Unibright UB-700 (a commercially available AES resin: polymeric resin of acrylonitrile, ethylene-propyrene and styrene, produced and sold by Sumitomo Nauga-tuck Co., Ltd.) in place of Kralastic MH to obtain a non-stabilized AES resin.

To 100 parts by weight of this non-stabilized AES resin were dry-blended 1.0 part by weight of phthalocyanine blue, 0.3 part by weight of n-octadecyl-3-(3,5-di-tert-butyl-4-hydroxyphenyl)propionate, 0.3 part by weight of 2-tert-butyl-6-(3-tert-butyl-5-methyl-2-hydroxybenzyl)-4-methylphenyl acrylate, 0.3 part by weight of tris(2,4-di-tert-butylphenyl)phosphite and specified amounts (parts by weight) of weathering stabilizers shown in Table 3, and each blend was extruded into pellets by using a 30 mmφ extruder at 230° C.

Test specimens were prepared in the same way as Example 1 and subjected to the same weathering test as conducted in Example 1.

The results are shown in Table 3.

TABLE 3

| | | Hindered piperidine compound | | Benzotriazole compound | | Others | | Weathering resistance Gloss life (hr) |
|---|---|---|---|---|---|---|---|---|
| | No. | Name | Amount blended | Name | Amount blended | Name | Amount blended | |
| Example | 1 | H-1 | 0.75 | UVA-1 | 0.75 | | | 960 |
| | 2 | H-1 | 0.75 | UVA-2 | 0.75 | | | 980 |
| | 3 | H-3 | 0.75 | UVA-2 | 0.75 | | | 940 |
| | 4 | H-4 | 0.75 | UVA-1 | 0.75 | | | 950 |
| | 5 | H-6 | 0.75 | UVA-2 | 0.75 | | | 920 |
| | 6 | H-1 | 1.2 | UVA-1 | 0.3 | | | 960 |
| | 7 | H-1 | 0.3 | UVA-1 | 1.2 | | | 900 |
| Comparative Example | 1 | H-1 | 1.5 | | | | | 700 |
| | 2 | H-3 | 1.5 | | | | | 680 |
| | 3 | | | UVA-1 | 1.5 | | | 580 |
| | 4 | | | UVA-2 | 1.5 | | | 750 |
| | 5 | H-1 | 0.75 | | | UVA-3 | 0.75 | 730 |
| | 6 | H-1 | 0.75 | | | UVA-4 | 0.75 | 720 |
| | 7 | H-7 | 0.75 | UVA-2 | 0.75 | | | 750 |

As seen from the above-shown examples, single use of hindered piperidine compounds or benzotriazole compounds can not provide a satisfactory improvement of weathering resistance of styrene polymer (see Comparative Example Nos. 1 to 6 in Table 2 and Comparative Example Nos. 1 to 4 in Table 3). Also, almost no appreciable improvement of weathering resistance can be obtained even when a benzotriazole compound UVA-3 having a structural resemblance to the specified benzotriazole compounds of the present invention is used with a hindered piperidine compound (Comparative Example No. 7 in Table 2 and Comparative Example No. 5 in Table 3) or when a hindered piperidine compound H-7 having a similar structure to the specified hindered piperidine compounds of the present invention is used with a benzotriazole compound (Comparative Example No. 9 in Table 2 and Comparative Example No. 7 in Table 3). On the other hand, when a specified hindered piperidine compound and a specified benzotriazole compound are used in a specified combination according to the present invention, there can be obtained a styrene polymer having very excellent weathering resistance.

What is claimed is:

1. A stabilized styrene polymer composition comprising
   (A) a hindered piperidine compound represented by the formula

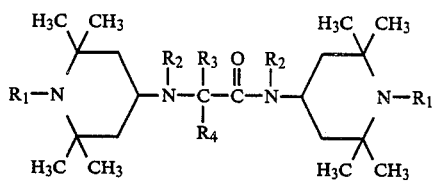

wherein
   $R_1$ is a hydrogen atom or an alkyl group having 1 to 3 carbon atoms,
   $R_2$ is a hydrogen atom or an alkyl group having 1 to 12 carbon atoms, and
   $R_3$ and $R_4$ are each independently an alkyl group having 1 to 4 carbon atoms;
   (B) a benzotriazole compound selected from the group consisting of 2-(2-hydroxy-5-methylphenyl)-benzotriazole and 2-(2-hydroxy-3-tert-butyl-5-methylphenyl)-5-chlorobenzotriazole; and
   (C) a styrene polymer.

2. The styrene polymer composition according to claim 1, wherein $R_1$ in said formula is a hydrogen atom or a methyl group.

3. The styrene polymer composition according to claim 1, wherein $R_2$ in said formula is a hydrogen atom or an alkyl group having 1 to 4 carbon atoms.

4. The styrene polymer composition according to claim 1, wherein $R_3$ or $R_4$ in said formula is a methyl group.

5. The styrene polymer composition according to claim 1, wherein said hindered piperidine compound is

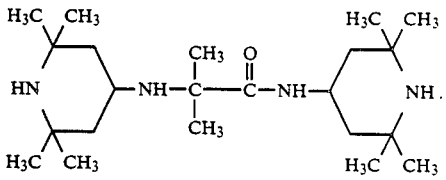

6. The styrene polymer composition according to claim 1, wherein a total amount of said hindered piperidine compound and said benzotriazole compound is 0.05 to 5 parts by weight per 100 parts by weight of said styrene polymer.

7. The styrene polymer composition according to claim 6, wherein the amount of said hindered piperidine compound and said benzotriazole compound is 0.1 to 2 parts by weight per 100 parts by weight of said styrene polymer.

8. The styrene polymer composition according to claim 1, wherein the weight ratio of said hindered piperidine compound to said benzotriazole compound is 20:80 to 95:5.

9. The styrene polymer composition according to claim 8, wherein the weight ratio of said hindered piperidine compound to said benzotriazole compound is 40:60 to 90:10.

10. The styrene polymer composition according to claim 1, which further contains pigment.

11. The styrene polymer composition according to claim 1, which further contains antioxidant.

12. The styrene polymer composition according to claim 11, wherein said antioxidant is a phenolic compound, amine compound or phosphite compound.

13. A method for stabilizing a styrene polymer, which comprises incorporating into said styrene polymer
   (A) a hindered piperidine compound represented by the formula

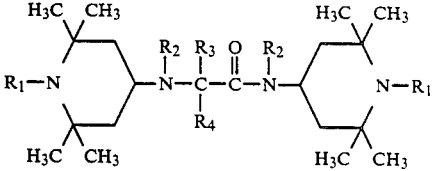

wherein
   $R_1$ is a hydrogen atom or an alkyl group having 1 to 3 carbon atoms,
   $R_2$ is a hydrogen atom or an alkyl group having 1 to 12 carbon atoms, and
   $R_3$ and $R_4$ are each independently an alkyl group having 1 to 4 carbon atoms; and
   (B) a benzotriazole compound selected from the group consisting of 2-(2-hydroxy-5-methylphenyl)-benzotriazole and 2-(2-hydroxy-3-tert-butyl-5-methylphenyl)-5-chlorobenzotriazole.

14. A styrene polymer stabilized by the method of claim 13.

* * * * *